(12) United States Patent
Puviyarasu et al.

(10) Patent No.: US 12,380,400 B2
(45) Date of Patent: Aug. 5, 2025

(54) SYSTEMS AND METHODS OF MAPPING AN INTERIOR SPACE OF A PRODUCT STORAGE FACILITY

(71) Applicant: Walmart Apollo, LLC, Bentonville, AR (US)

(72) Inventors: Paarvendhan Puviyarasu, Dallas, TX (US); Yilun Chen, Dallas, TX (US); Harish Polusani, Plano, TX (US); Adam Cantor, Austin, TX (US); Benjamin R. Ellison, San Francisco, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 322 days.

(21) Appl. No.: 17/966,580

(22) Filed: Oct. 14, 2022

(65) Prior Publication Data

US 2024/0127168 A1 Apr. 18, 2024

(51) Int. Cl.
| | |
|---|---|
| *G06Q 10/087* | (2023.01) |
| *G06V 20/00* | (2022.01) |
| *G06V 20/64* | (2022.01) |

(52) U.S. Cl.
CPC .......... *G06Q 10/087* (2013.01); *G06V 20/36* (2022.01); *G06V 20/647* (2022.01); *G06V 2201/07* (2022.01)

(58) Field of Classification Search
CPC .. G06Q 10/087; G06Q 10/08; G06Q 10/0833; G06V 20/36; G06V 20/647; G06V 2201/07; G06V 20/52
See application file for complete search history.

(56) References Cited

U.S. PATENT DOCUMENTS 5,074,594 A 12/1991 Laganowski
6,570,492 B1 5/2003 Peratoner
(Continued)

FOREIGN PATENT DOCUMENTS

CN 106347550 B 8/2019
CN 110348439 B 10/2019
(Continued)

OTHER PUBLICATIONS

U.S. Appl. No. 17/963,751, filed Oct. 11, 2022, Yilun Chen.
(Continued)

*Primary Examiner* — Florian M Zeender
*Assistant Examiner* — Vanessa Deligi
(74) *Attorney, Agent, or Firm* — Foley IP Law, PLLC

(57) ABSTRACT

Systems and methods for use in mapping an interior space of a product storage facility include at least one sensor that captures distance measurement data with respect to an interior space of the product storage facility. A computing device obtains a first image representing a 2-dimensional map of the interior space of the product storage facility and processes this image to define a boundary of the interior space of the product storage facility and detect individual structures located within the interior space of the product storage facility. Then, the computing device defines separate department areas, assigns a department label to each of the separate department areas, and converts the 2-dimensional map representing the detected structures and the defined separate department areas and the department labels assigned to the separate department areas into a second image representing a 3-dimensional map of the interior space of the product storage facility.

20 Claims, 9 Drawing Sheets

(56) References Cited

U.S. PATENT DOCUMENTS

| | | | |
|---|---|---|---|
| 8,923,650 | B2 | 12/2014 | Wexler |
| 8,965,104 | B1 | 2/2015 | Hickman |
| 9,275,308 | B2 | 3/2016 | Szegedy |
| 9,477,955 | B2 | 10/2016 | Goncalves |
| 9,526,127 | B1 | 12/2016 | Taubman |
| 9,576,310 | B2 | 2/2017 | Cancro |
| 9,659,204 | B2 | 5/2017 | Wu |
| 9,811,754 | B2 | 11/2017 | Schwartz |
| 10,002,344 | B2 | 6/2018 | Wu |
| 10,019,803 | B2 | 7/2018 | Venable |
| 10,032,072 | B1 | 7/2018 | Tran |
| 10,129,524 | B2 | 11/2018 | Ng |
| 10,210,432 | B2 | 2/2019 | Pisoni |
| 10,373,116 | B2 | 8/2019 | Medina |
| 10,572,757 | B2 | 2/2020 | Graham |
| 10,592,854 | B2 | 3/2020 | Schwartz |
| 10,839,452 | B1 | 11/2020 | Guo |
| 10,922,574 | B1 | 2/2021 | Tariq |
| 10,943,278 | B2 | 3/2021 | Benkreira |
| 10,956,711 | B2 | 3/2021 | Adato |
| 10,990,950 | B2 | 4/2021 | Garner |
| 10,991,036 | B1* | 4/2021 | Bergstrom ......... G06Q 30/0643 |
| 11,036,949 | B2 | 6/2021 | Powell |
| 11,055,905 | B2 | 7/2021 | Tagra |
| 11,087,272 | B2 | 8/2021 | Skaff |
| 11,151,426 | B2 | 10/2021 | Dutta |
| 11,163,805 | B2 | 11/2021 | Arocho |
| 11,276,034 | B2 | 3/2022 | Shah |
| 11,282,287 | B2 | 3/2022 | Gausebeck |
| 11,295,163 | B1 | 4/2022 | Schoner |
| 11,308,775 | B1 | 4/2022 | Sinha |
| 11,409,977 | B1 | 8/2022 | Glaser |
| 11,783,400 | B1* | 10/2023 | Schack ............. G06Q 30/0643 |
| | | | 705/26.7 |
| 12,039,488 | B2* | 7/2024 | Marquette ............ G06V 20/64 |
| 2005/0238465 | A1 | 10/2005 | Razumov |
| 2005/0256726 | A1* | 11/2005 | Benson ............. G06Q 10/0637 |
| | | | 705/28 |
| 2011/0040427 | A1 | 2/2011 | Ben-Tzvi |
| 2014/0002239 | A1 | 1/2014 | Rayner |
| 2014/0244207 | A1* | 8/2014 | Hicks ................ G06Q 30/0201 |
| | | | 702/150 |
| 2014/0247116 | A1 | 9/2014 | Davidson |
| 2014/0307938 | A1 | 10/2014 | Doi |
| 2015/0363660 | A1 | 12/2015 | Vidal |
| 2016/0203525 | A1 | 7/2016 | Hara |
| 2017/0004437 | A1* | 1/2017 | Clemenson ......... G06Q 50/165 |
| 2017/0106738 | A1 | 4/2017 | Gillett |
| 2017/0249765 | A1* | 8/2017 | Hari ...................... G06F 40/103 |
| 2017/0286773 | A1* | 10/2017 | Skaff ..................... G06N 3/008 |
| 2018/0001481 | A1* | 1/2018 | Shah ..................... B25J 11/008 |
| 2018/0005176 | A1 | 1/2018 | Williams |
| 2018/0018788 | A1 | 1/2018 | Olmstead |
| 2018/0197223 | A1 | 7/2018 | Grossman |
| 2018/0260772 | A1 | 9/2018 | Chaubard |
| 2019/0025849 | A1 | 1/2019 | Dean |
| 2019/0043003 | A1 | 2/2019 | Fisher |
| 2019/0050932 | A1 | 2/2019 | Dey |
| 2019/0087772 | A1 | 3/2019 | Medina |
| 2019/0163698 | A1 | 5/2019 | Kwon |
| 2019/0197561 | A1 | 6/2019 | Adato |
| 2019/0220482 | A1 | 7/2019 | Crosby |
| 2019/0236531 | A1 | 8/2019 | Adato |
| 2019/0272491 | A1* | 9/2019 | Das .................. G06Q 10/06313 |
| 2020/0246977 | A1 | 8/2020 | Swietojanski |
| 2020/0265494 | A1 | 8/2020 | Glaser |
| 2020/0324976 | A1 | 10/2020 | Diehr |
| 2020/0356813 | A1 | 11/2020 | Sharma |
| 2020/0380226 | A1 | 12/2020 | Rodriguez |
| 2020/0387858 | A1 | 12/2020 | Hasan |
| 2021/0049541 | A1 | 2/2021 | Gong |
| 2021/0049542 | A1 | 2/2021 | Dalal |
| 2021/0142105 | A1 | 5/2021 | Siskind |
| 2021/0150231 | A1 | 5/2021 | Kehl |
| 2021/0192780 | A1 | 6/2021 | Kulkarni |
| 2021/0216954 | A1 | 7/2021 | Chaubard |
| 2021/0272269 | A1 | 9/2021 | Suzuki |
| 2021/0319684 | A1 | 10/2021 | Ma |
| 2021/0342914 | A1 | 11/2021 | Dalal |
| 2021/0400195 | A1 | 12/2021 | Adato |
| 2022/0043547 | A1 | 2/2022 | Jahjah |
| 2022/0051179 | A1 | 2/2022 | Savvides |
| 2022/0058425 | A1 | 2/2022 | Savvides |
| 2022/0067085 | A1 | 3/2022 | Nihas |
| 2022/0114403 | A1 | 4/2022 | Shaw |
| 2022/0114821 | A1 | 4/2022 | Arroyo |
| 2022/0138914 | A1 | 5/2022 | Wang |
| 2022/0164493 | A1* | 5/2022 | Li ........................... G06V 20/36 |
| 2022/0165074 | A1 | 5/2022 | Srivastava |
| 2022/0222924 | A1 | 7/2022 | Pan |
| 2022/0262008 | A1 | 8/2022 | Kidd |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/961,350, filed Oct. 21, 2022, Jing Wang.
U.S. Appl. No. 17/983,773, filed Nov. 9, 2022, Lingfeng Zhang.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 126-131.
Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-13.
Paolanti, Marine et al.; "Mobile robot for retail surveying and inventory using visual and textual analysis of monocular pictures based on deep learning"; European Conference on Mobile Robots; Sep. 2017, 6 pages.
Ramanpreet Kaur et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; 11 pages.
Refills; "Final 3D object perception and localization"; European Commision, Dec. 31, 2016, 16 pages.
Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.
Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.
Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-12.

(56) References Cited

OTHER PUBLICATIONS

Singh, Ankit; "Image Recognition and Object Detection in Retail"; <https://blog.paralleldots.com/featured/image-recognition-and-object-detection-in-retail/>; Sep. 26, 2019; pp. 1-11.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; pp. 10778-10787.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-8.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal et al.; "Object identification for inventory management using convolutional neural network"; IEEE Applied Imagery Pattern Recognition Workshop (AIPR); Oct. 2016, 6 pages.

\* cited by examiner

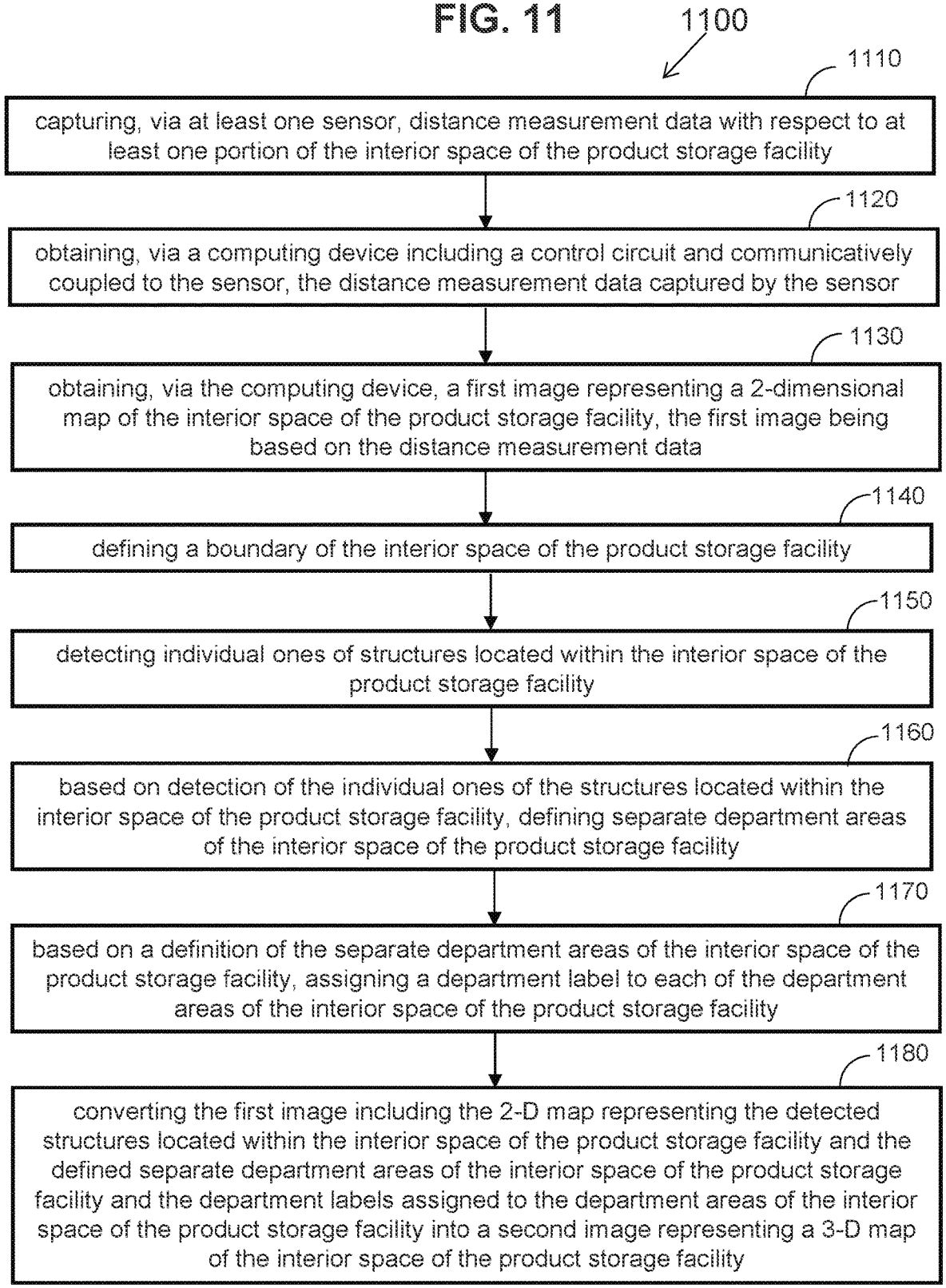

SYSTEMS AND METHODS OF MAPPING AN INTERIOR SPACE OF A PRODUCT STORAGE FACILITY

TECHNICAL FIELD

This disclosure relates generally to managing inventory at product storage facilities, and in particular, to mapping the structures located in an interior space of a product storage facility.

BACKGROUND

A typical product storage facility (e.g., a retail store, a product distribution center, a warehouse, etc.) may have hundreds of shelves and thousands of products stored on the shelves and/or on pallets. Individual products offered for sale to consumers are typically stocked on shelves, pallets, and/or each other in a product storage space having a price tag label assigned thereto. It is common for workers of such product storage facilities to manually (e.g., visually) inspect product display shelves and other product storage spaces to determine which product display shelves are fully stocked with products and which are not.

Given the very large number of product storage areas such as shelves, pallets, and other product displays at product storage facilities of large retailers, and the even larger number of products stored in the product storage areas, manual inspection of the product storage structures and the products on these product storage structures by the workers is very time consuming and significantly increases the operations cost for a retailer, since these workers could be performing other tasks if they were not involved in manually inspecting the product storage structures and products to determine whether the product storage structures are properly stocked with products.

BRIEF DESCRIPTION OF THE DRAWINGS

Disclosed herein are embodiments of systems and methods for use in mapping an interior space of a product storage facility. This description includes drawings, wherein:

FIG. 11 is a flow diagram of an exemplary process of mapping an interior space of a product storage facility in accordance with some embodiments.

Figure 1:
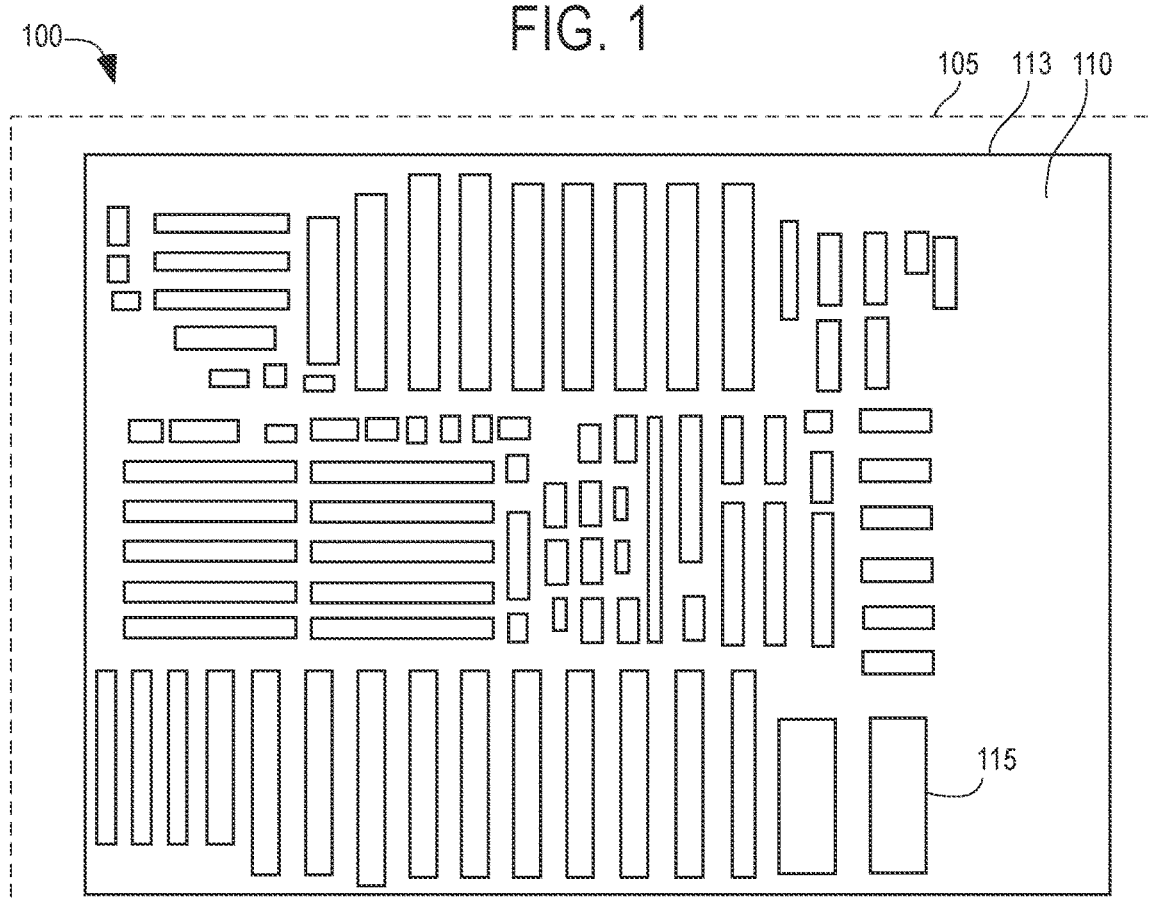
FIG. 1 is a diagram of an exemplary system for use in mapping an interior space of a product storage facility in accordance with some embodiments, depicting a top view of an interior space of the product storage facility having multiple different product storage structures therein that is being monitored by an image capture device that is configured to move about the product storage facility.
Figure 1:
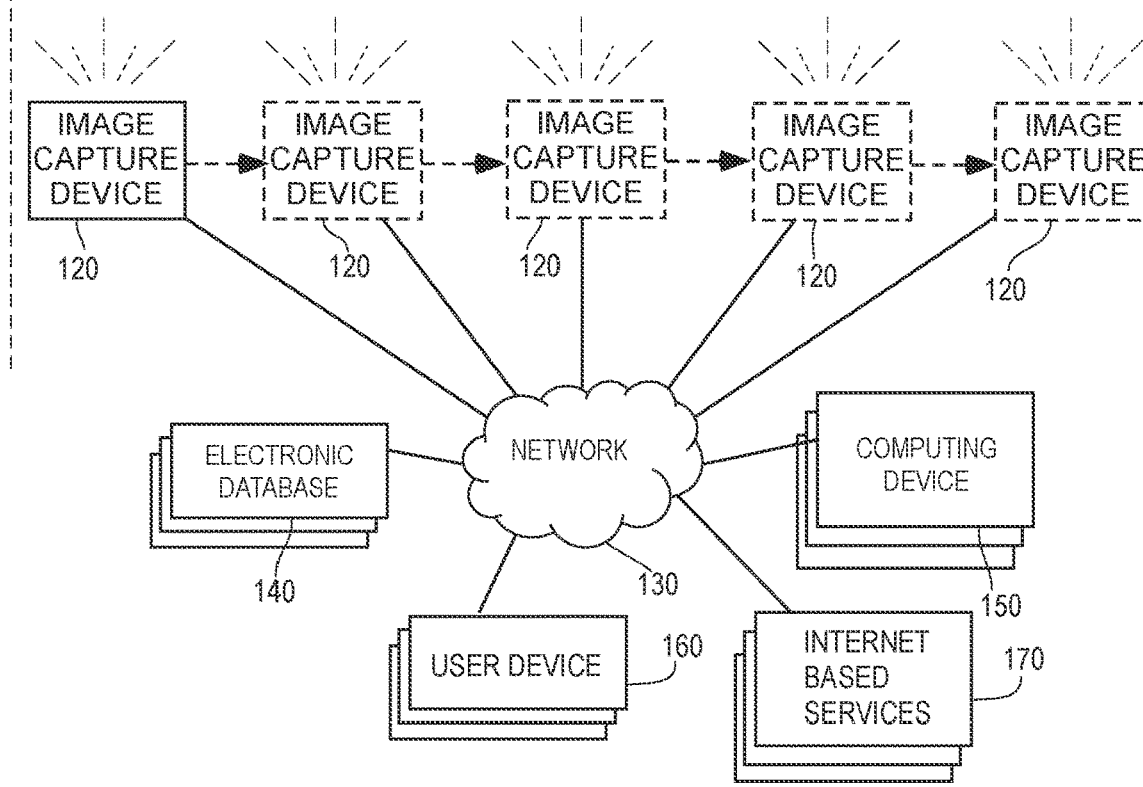

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the invention. Also, common but well-understood elements that are useful or necessary in a commercially feasible embodiment are often not depicted in order to facilitate a less obstructed view of these various embodiments of the invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the invention. Thus, appearances of the phrases "in one embodiment," "in an embodiment," and similar language throughout this specification may, but do not necessarily, all refer to the same embodiment.

Generally, systems and methods for use in mapping an interior space of a product storage facility include at least one sensor that captures distance measurement data with respect to an interior space of the product storage facility. A computing device obtains a first image representing a 2-dimensional map of the interior space of the product storage facility and processes this image to define a boundary of the interior space of the product storage facility and detect individual structures located within the interior space of the product storage facility. Then, the computing device defines separate department areas, assigns a department label to each of the separate department areas, and converts the 2-dimensional map representing the detected structures and the defined separate department areas and the department labels assigned to the separate department areas into a second image representing a 3-dimensional map of the interior space of the product storage facility.

In some embodiments, a system for use in mapping an interior space of a product storage facility includes at least one sensor configured to capture distance measurement data with respect to at least one portion of the interior space of the product storage facility and a computing device including a control circuit and communicatively coupled to the at least one sensor. The computing device is configured to obtain a first image representing a 2-dimensional map of the interior space of the product storage facility, the first image being based on the distance measurement data and process the first image to: define a boundary of the interior space of the product storage facility; detect individual ones of structures located within the interior space of the product storage facility; based on detection of the individual ones of the structures located within the interior space of the product storage facility, define separate department areas of the interior space of the product storage facility; based on a definition of the separate department areas of the interior space of the product storage facility, assign a department label to each of the separate department areas of the interior space of the product storage facility; and convert the first image including the 2-dimensional map representing the detected structures located within the interior space of the facility and the defined separate department areas of the interior space of the product storage facility and the department labels assigned to respective ones of the separate department areas of the interior space of the product storage facility into a second image representing a 3-dimensional map of the interior space of the product storage facility.

In some embodiments, a method of mapping an interior space of a product storage facility includes: capturing, via at least one sensor, distance measurement data with respect to at least one portion of the interior space of the product storage facility; obtaining, via a computing device including a control circuit and communicatively coupled to the at least one sensor, the distance measurement data captured by the at least one sensor; obtaining, via the computing device, a first image representing a 2-dimensional map of the interior space of the product storage facility, the first image being based on the distance measurement data; and processing, via the control circuit of the computing device, the obtained first image to: define a boundary of the interior space of the product storage facility; detect individual ones of structures located within the interior space of the product storage facility; based on detection of the individual ones of the structures located within the interior space of the product storage facility, define separate department areas of the interior space of the product storage facility; based on a definition of the separate department areas of the interior space of the product storage facility, assign a department label to each of the department areas of the interior space of the product storage facility; and convert the first image including the 2-dimensional map representing the detected structures located within the interior space of the product storage facility and the defined separate department areas of the interior space of the product storage facility and the department labels assigned to respective ones of the department areas of the interior space of the product storage facility into a second image representing a 3-dimensional map of the interior space of the product storage facility.

FIG. 1 shows an exemplary embodiment of a system 100 for use in mapping an interior space 110 of a product storage facility 105 (which may be a retail store, a product distribution center, a warehouse, etc.). The system 100 is illustrated in FIG. 1 for simplicity with only one movable image capture device 120 that moves about the interior space 110 of the product storage facility 105, but it will be appreciated that the system 100 may include multiple movable image capture devices 120 located throughout the product storage facility 105 that monitor hundreds or thousands of product storage structures 115 located at the product storage facility 105.

It is understood the direction and type of movement of the image capture device 120 about the interior space 110 of the product storage facility 105 may depend on the physical arrangement of the interior space 110 of the product storage facility 105 and/or the size and shape of the product storage structures 115 located within the interior space 110 of the product storage facility 105. For example, the image capture device 120 may move linearly down an aisle alongside a product storage structure 115 (e.g., a shelving unit) located in an interior space 110 of a product storage facility 105, or may move in a circular fashion around a table having curved/multiple sides.

Figure 8:
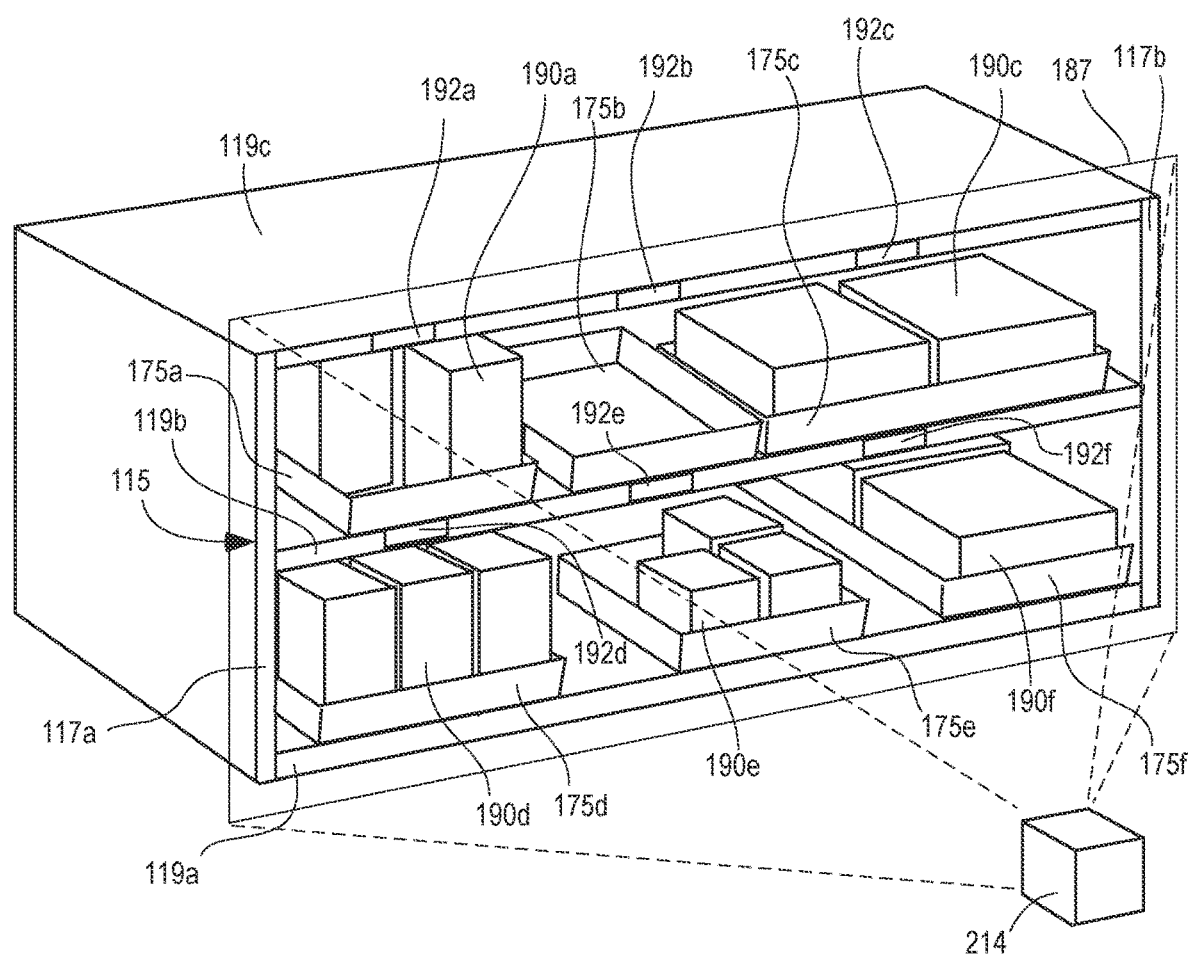
FIG. 8 is a front perspective view of an exemplary product storage structure with products stocked thereon and an exemplary image capture device capturing an image of this product storage structure in accordance with some embodiments.

Notably, the term "product storage structure" as used herein generally refers to a structure on which products 190 are stored (see e.g., the exemplary product storage structure 115 in FIG. 8), and may include a pallet, a shelf cabinet, a single shelf, table, rack, refrigerator, freezer, displays, bins, gondola, case, countertop, or another product display. Likewise, it will be appreciated that the number of individual products 190 on the product storage structure 115 in FIG. 8 is chosen for simplicity and by way of example only, and that the product storage structure 115 may store more or less individual products 190 thereon. Further, the size and shape of the products 190 in FIG. 8 have been shown by way of example only, and it will be appreciated that the individual products 190 may have various sizes and shapes. Notably, the term "products" may refer to individual products 190 (some of which may be single-piece/single-component products and some of which may be multi-piece/multi-component products), as well as to packages or containers of products 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal, a bottle of shampoo, etc.).

The image capture device 120 (also referred to as an image capture unit) of the exemplary system 100 depicted in FIG. 1 is configured for movement about the product storage facility 105 (e.g., on the floor via a motorized or non-motorized wheel-based and/or track-based locomotion system, or via slidable tracks above the floor, etc.) such that, when moving (e.g., about an aisle or other area of within the interior space 110 of the product storage facility 105), the image capture device 120 is has a field of view that includes at least a portion at least one product storage structure 115, permitting the image capture device 120 to capture multiple images of the product storage structure 115 from various viewing angles.

In some embodiments, the image capture device 120 is configured as robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images or sensing distance measurements within the interior space 110 of the product storage facility 105. Notably, while reference is made to the image capture device 120, as pointed out below, the image capture device 120 is not limited to purely capturing images of the product storage structures 115 within the interior space 110 of the product storage facility, and may include various sensors (one example of which is a laser imaging, detection, and ranging (LIDAR) sensor) that permit the image capture device 120 to capture, e.g., distance measurement data, and perform various other functions.

In some embodiments, as will be described in more detail below, the distance measurement data (e.g., LIDAR data) and/or the images 188 of the interior space 110 of the product storage facility 105 captured by the image capture device 120 while moving about the interior space 110 are transmitted by the image capture device 120 over a network 130 to an electronic database 140 and/or to a computing device 150. In some aspects, the computing device 150 (or a separate image processing internet based/cloud-based service module) is configured to process such data and images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, distance measurement data database, meta data database, inventory database, pricing database, customer database, vendor database, manufacturer database, etc.) and is configured to store various raw and processed images (e.g., 180, 182, 184, 186, and 188) of the interior space 110 of the product storage facility 105 captured by the image capture device 120 while the image capture device 120 is moving about the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
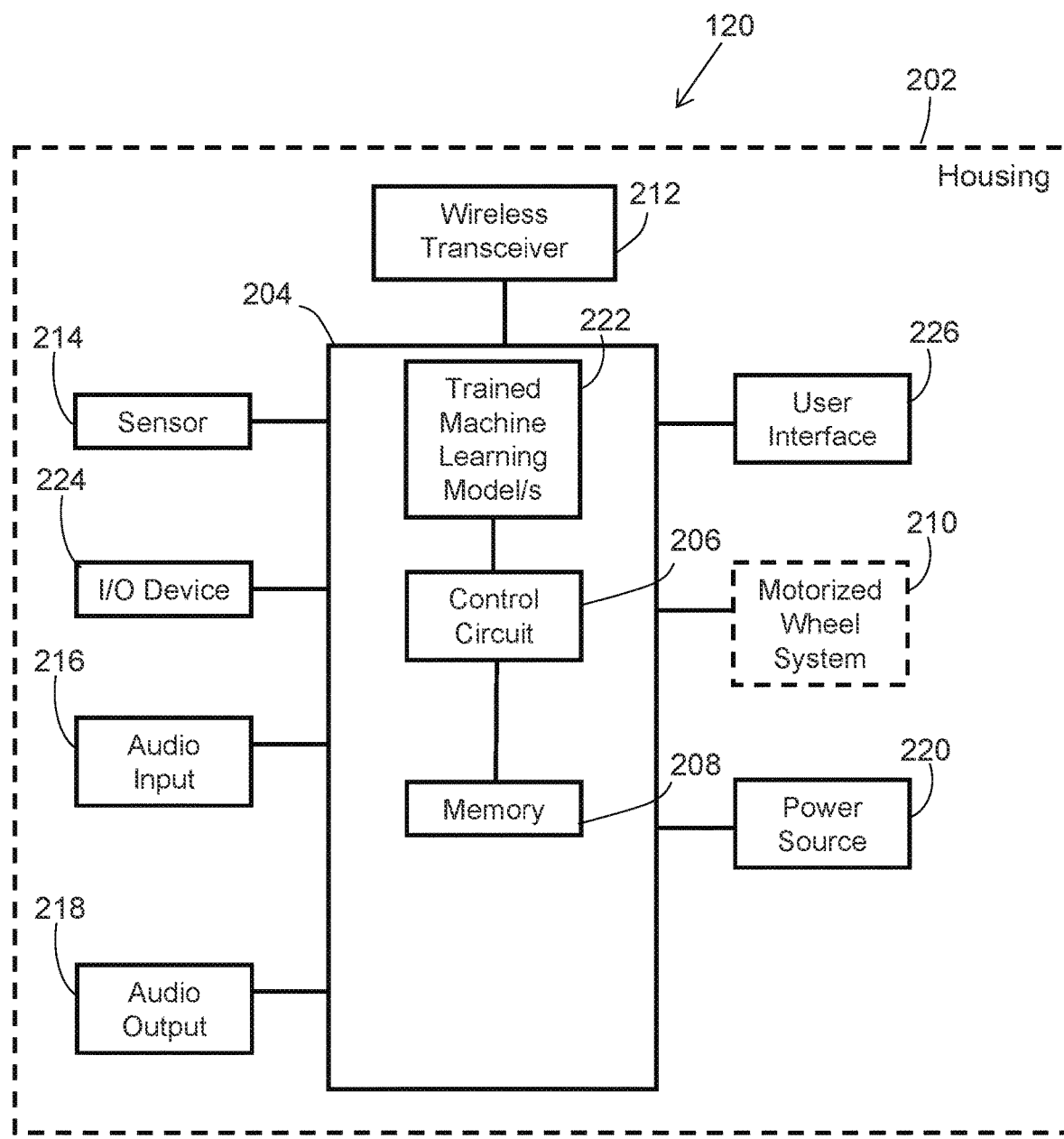
FIG. 2 is a block diagram of an exemplary image capture device in accordance with some embodiments.

FIG. 2 presents a more detailed example of an exemplary motorized robotic image capture device 120. As mentioned above, the image capture device 102 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing detecting various distance measurements and/or capturing images of various portions of the interior space 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the exemplary embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is product storage structure number so-and-so?, how many products are stocked on product storage structure so-and-so? etc.) to the control circuit 206 via the audio input 216.

In the exemplary embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the exemplary embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 310 may be trained to process the distance measurement (e.g., LIDAR) data and/or one or more images 188 of the interior space 110 of the product storage facility 105 to detect and/or recognize one or more product storage structures 115 and/or products 190 and/or price tag labels 192 using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 is a motorized robotic device capable of moving about the product storage facility 105 while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
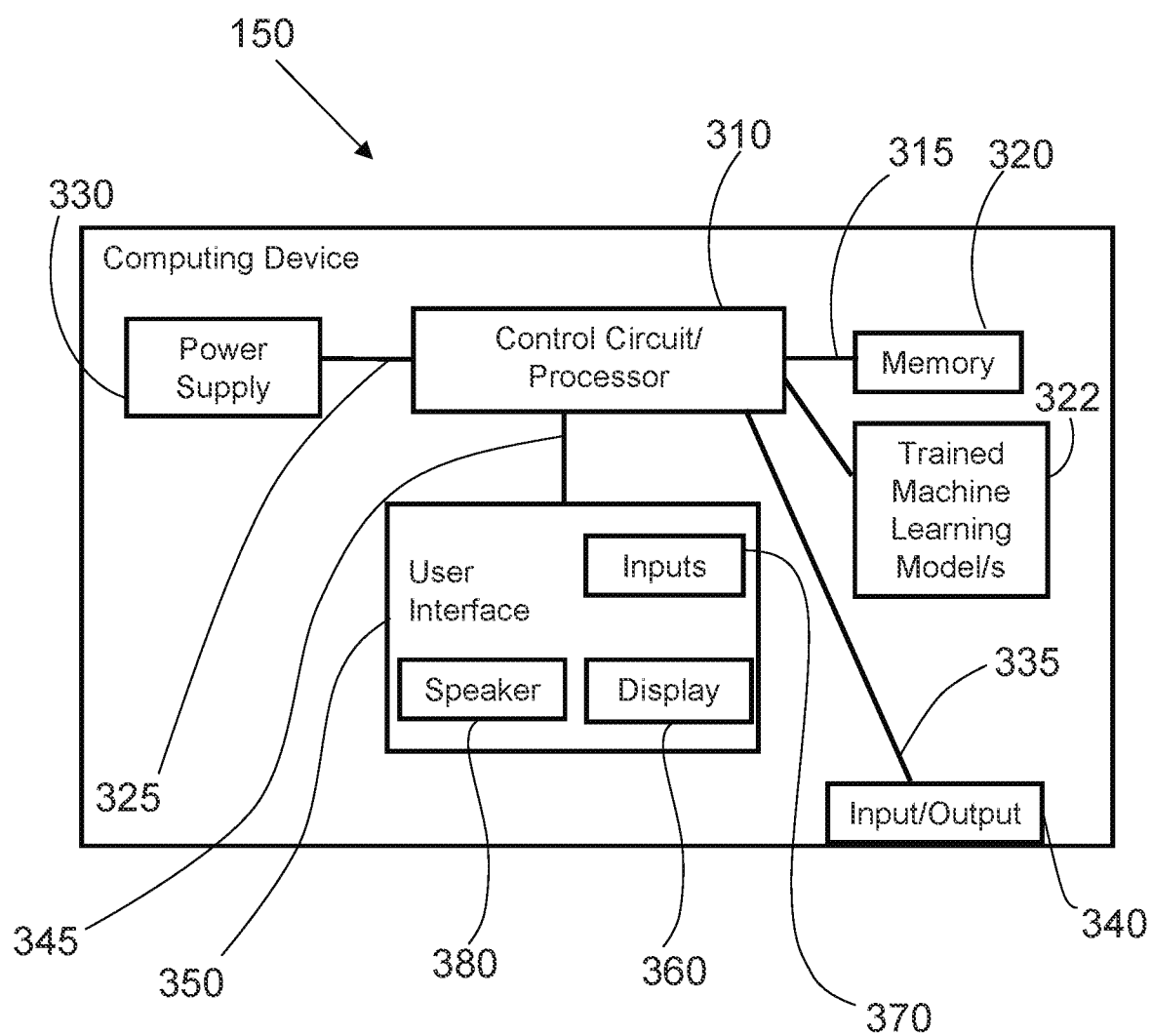
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

Figure 5:
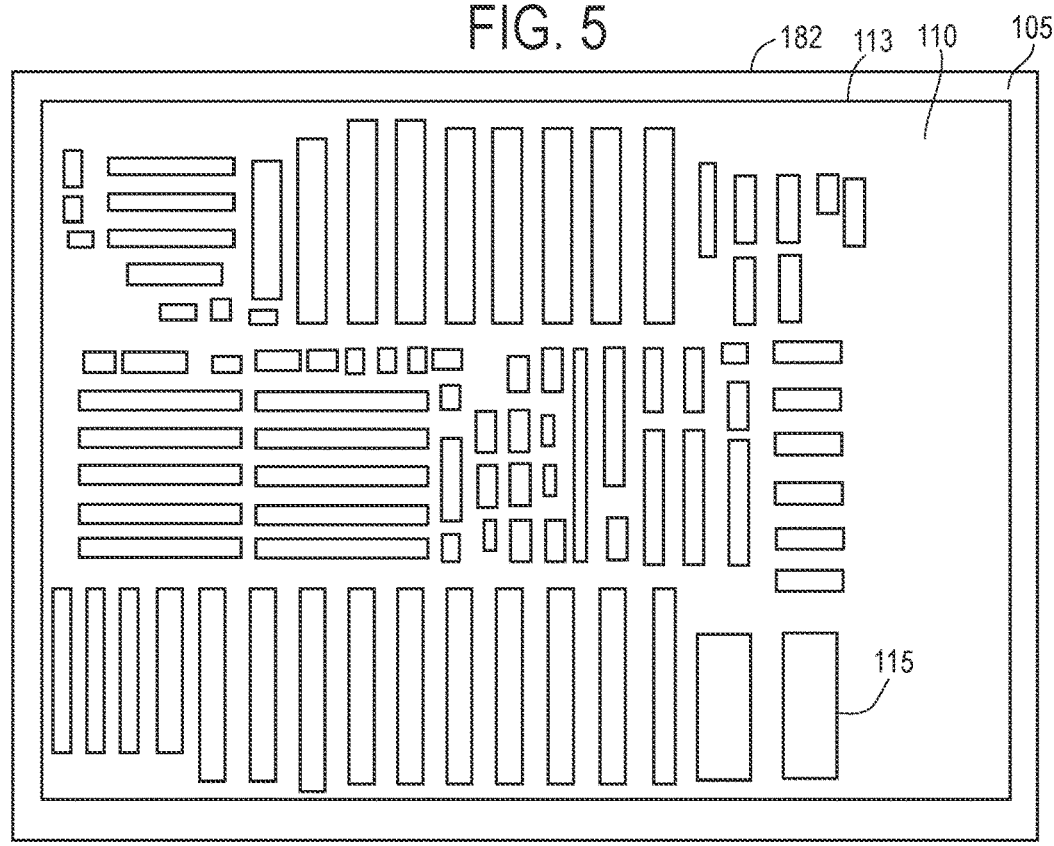
FIG. 5 is a diagram of the exemplary image of FIG. 4, after the image is processed to clean up the raw image data to generate a clean top view of the interior space of the product storage facility and the product storage structures located therein.
Figure 6:
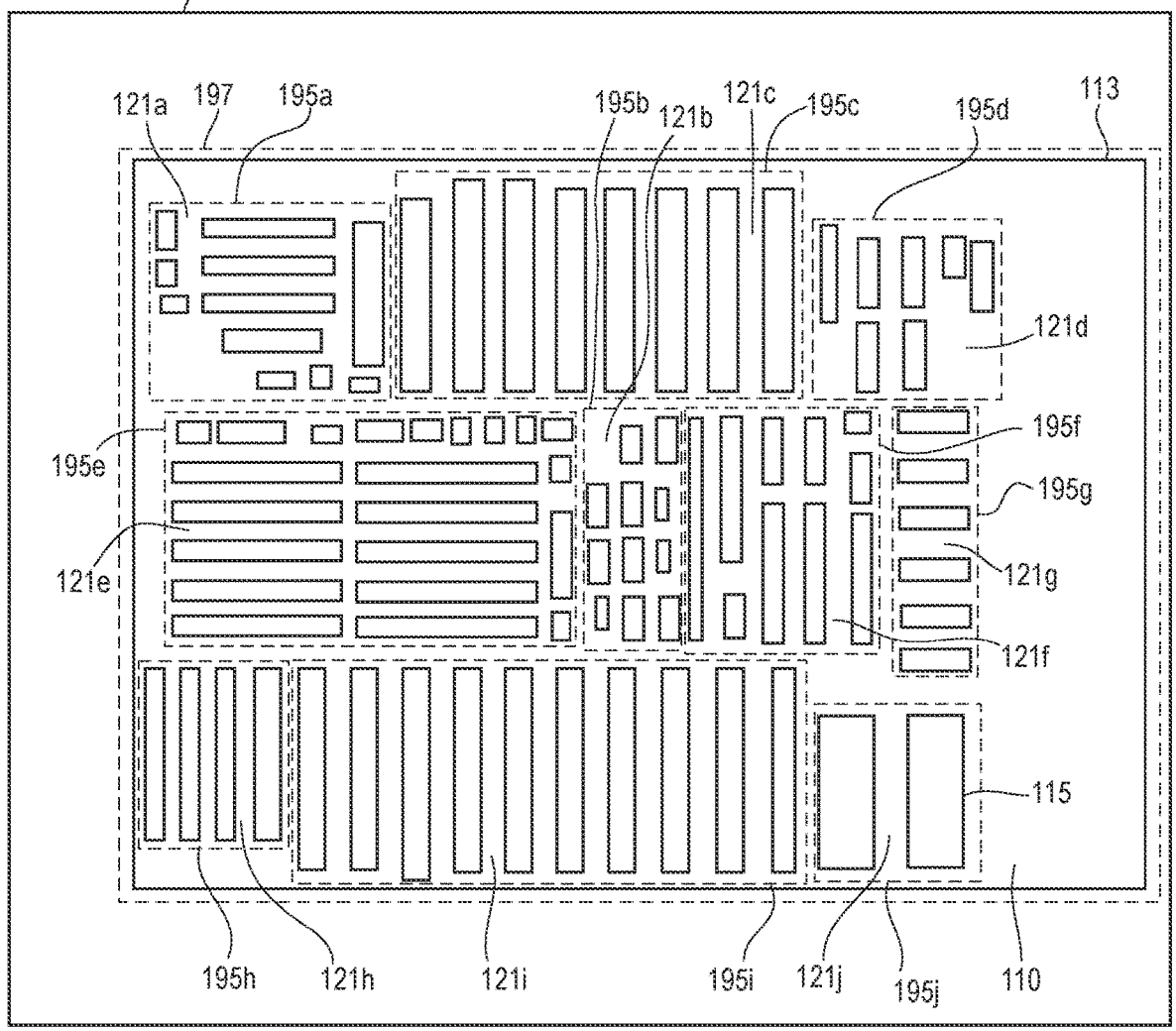
FIG. 6 is a diagram of the exemplary image of FIG. 5, after the image is processed to determine a number of adjacent separate department areas detected in the image, and after a department name label is assigned to each of the adjacent separate department areas.

The control circuit 310 of the computing device 150 is also electrically coupled via a connection 335 to an input/output 340 that can receive signals (e.g., LIDAR data, image data, etc.) from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage structures 115 and observing the individual products 190 stocked thereon). The input/output 340 of the computing device 150 can also send signals to other devices, for example, a signal to the electronic database 140 including a processed image 182 of the interior space 110 of the exemplary product storage facility 105 as shown in FIG. 5, or a processed image 184 of the interior space 110 of the exemplary product storage facility 105 as shown in FIG. 6. Also, a signal may be sent by the computing device 150 via the input/output 340 to the image capture device 120 to, e.g., provide a route of movement for the image capture device 120 through the product storage facility 105.

The processor-based control circuit 310 of the computing device 150 shown in FIG. 3 is electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the inventory at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to assign a task to the worker that requires the worker to, e.g., visually inspect and/or restock with products 190 a given product storage structure 115 based on analysis by the computing device 150 of the LIDAR data detected by the image capture device 120 and/or based on the image 187 (see FIG. 8) of the product storage structure 115 captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 310 of the computing device 150 may be programmed to perform such functions without a human operator.

As pointed out above, in some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105. In the exemplary embodiment illustrated in FIGS. 1 and 2, when the image capture device 120 moves about the interior space 110 of the product storage facility 105, the sensor 214 of the image capture device 120, which in this example includes a LIDAR sensor, captures distance measurement data with respect to the interior space 110 of the product storage facility 105 and the product storage structures 115 located within the interior space 110. In some implementations, the distance measurement data generated by the sensor 214 does not only sense the distance from the image capture device 120 to product storage structures 115 located within the interior space 110 of the product storage facility 105, but also senses the boundaries 113 (i.e., walls, etc.) of the product storage facility 105.

In certain aspects, the image capture device 120 is configured to move about the interior space 110 of the product storage facility 105 while sending out (e.g., via the sensor 214 or transceiver 212 of the image capture device 120) laser light, which is reflected from the objects (e.g., product storage structures 115, physical boundaries 113, etc.) located at the product storage facility 105 at certain predetermined time intervals (e.g., every 1 second, 5 seconds, 10 seconds, etc.), and this reflected light is detected by the sensor 214 and the time of travel of the laser light from the sensor 214 to the object and back to the sensor 214 from the object is used (e.g., by the control circuit 206 of the image capture device 120 by the control circuit 310 of the computing device 150, and/or by an internet-based service 170) to develop a raw image 180 depicting a distance map of the objects (i.e., product storage structures 115) located within an interior space 110 of the product storage facility 105 and the physical boundaries (i.e., walls) 113 of the interior space 110 product storage facility 105, as shown in FIG. 2. The raw image 180 of FIG. 2 may be transmitted to the electronic database 140 for storage and/or to the computing device 150 for processing by the control circuit 310 and/or to a web-/cloud-based image processing service 170.

In some aspects, the control circuit 310 of the computing device 150 obtains (e.g., from the electronic database 140, or from an image-processing internet-based service 170, or directly from the image capture device 120) an image 180 of the interior space 110 of the product storage facility 105 that is constructed (e.g., by the computing device 150, the image capture device 120, or the internet-based service 170) based on the distance measurement (e.g., LIDAR) data captured by the image capture device 120 while moving about the interior space 110 of the product storage facility 105. Generally, an exemplary map generated from LIDAR data as shown in the image 180 of FIG. 4 may be noisy and may have various patches, holes, and/or leaked areas that may affect the output of the 3-dimensional map model, such that the image 180 requires further processing to obtain a cleaner 2-dimensional model of the interior space 110 of the product storage facility 105.

In particular, in some implementations, the control circuit 310 of the computing device 150 is programmed to process the raw image 180 to clean up the data points and outliers in the LIDAR data, and then simplify/rectify the detected complex geometries into simpler shapes. In some aspects, the raw image 180 captured by the image capture device 120 may be processed via web-/cloud-based image processing service 170, which may be installed on the computing device 150 (or communicatively coupled to the computing device 150) and executed by the control circuit 310.

Figure 4:
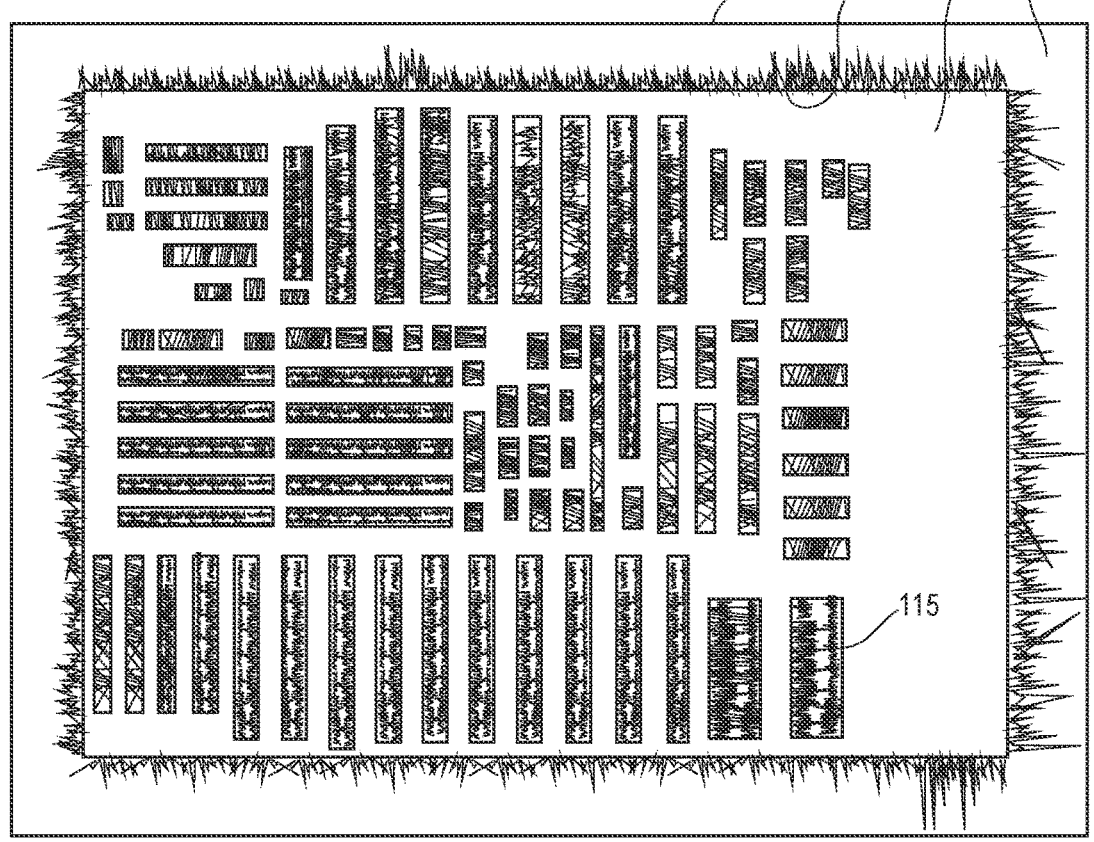
FIG. 4 is a diagram of an exemplary raw image of the interior space of the product storage facility that is generated based on the distance measurement data generated by the image capture device while the image capture device moves about the product storage facility.

In some embodiments, the control circuit 310 is programmed to execute a series of computer vision morphological operations to derive/define a clean defined boundary 113 for the interior space 110 of the product storage facility 105, as well as to remove smaller signal noises and object-like blobs and detect the individual product storage structures 115 and the larger blobs representing separate department areas 121a-121j that contain product storage structures 115 storing products 190 of the same general category (e.g., electronic, apparel, sporting goods, grocery, meats, etc.), and to remove from the image 180 smaller noises and blobs. In certain implementations, object map as seen in the image 180 of FIG. 4 is cleaned up and the individual product storage structures 115 and the separate department areas 121a-121j (shown in FIG. 6) are detected via the control circuit 310 executing one or more techniques including but not limited to splining, linear regression, nearest neighbor, and the like. In one aspect, the control circuit 310 of the computing device 150 obtains inventory data from the electronic database 140 or from an internet-based service 170 and uses the obtained inventory data (e.g., known dimensions, shapes, and layout of the product storage structures 115 located in the interior space 110 of the product storage facility 105) to further clean up the image 180 to result in a cleaned-up 2-dimensional map of the interior space 110 of the product storage facility 105 as depicted in the image 182 shown in FIG. 5.

As pointed out above, in some embodiments, the processing of the raw image 180 and/or the processed image 182 by the control circuit 310 of the computing device 150 enables the control circuit 310 to not only detect the physical location of the physical boundaries 113 (i.e., walls) of the interior space 110 of the product storage facility 105, but the physical location of each of the product storage structures 115 within the interior space 110 of the product storage facility 105, while also defining the physical locations, shapes, and boundaries of the separate department areas 121a-121j within the interior space 110 of the product storage facility 105.

In some embodiments, the control circuit 310 is programmed to detect the physical boundaries 113 of the interior space 110 of the product storage facility 105 by detecting the largest contour (representing the largest physical structure) in the image 180 and/or the image 182, and to interpret this largest detected contour as the physical boundary 113 (i.e., wall) of the product storage facility 105. Further, in some aspects, the control circuit 310 of the computing device 150 is configured to process the image 180 and/or the image 182 to detect the contours representing the overall size and shape of each of the individual product storage structures 115 within the interior space 110 of the product storage facility 105, and to separate the detected contours based on their respective areas and aspect ratios. In some embodiments, the control circuit 310 is configured to process the images 180 and 182 and detect each of the individual structures in the image 180 by executing one or more machine learning and/or computer vision modules and/or trained neural network modules/models 322. In certain aspects, the neural network executed by the control circuit 310 may be a deep convolutional neural network. The neural network module/model 322 may be trained using various data sets, including, but not limited to: raw image data extracted from the images 180; meta data extracted from the processed images 182; reference image data associated with reference images of various product storage structures 115 at the product storage facility 105; reference images of various products 190 stocked and/or sold at the product storage facility 105; reference images of various department areas 121a-121j at the product storage facility 105; and planogram data associated with the product storage facility 105.

In some embodiments, the control circuit 310 may be trained to process the image 182 of the interior space 110 at the product storage facility 105 to detect and/or recognize one or more product storage structures 190 and separate department areas 121a-121j using one or more computer vision/machine learning algorithms, including but not limited to Linear Regression, Logistic Regression, Splining, Nearest Neighbor, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process the image 182 as described herein. As pointed out above, it will be appreciated that the control circuit 310 may not process the raw image 180 shown in FIG. 4 to result in the processed image 182 shown in FIG. 5 and may not process the image 182 of FIG. 5 to result in the processed image 184 of FIG. 6, and that such processing may be performed by an internet-based service 170.

In some aspects, the control circuit 310 of the computing device 150 is configured to process the image 182 (e.g., via computer vision and one or more trained neural networks) to detect each of the individual product structures 115 and to detect (based on an analysis of known contours of the interior space 110 of the product storage facility 110) the exterior physical boundary 113 (which may include walls, windows, doors, etc.) of the product storage facility 105, and to generate a virtual boundary line 197 (as seen in exemplary image 184 in FIG. 6) around the exterior boundary 113 of the interior space 110 of the product storage facility 105. By the same token, in some aspects, the control circuit 310 of the computing device 150 is configured to process the image 182 of FIG. 5 (e.g., via computer vision and one or more trained neural networks) to detect each of the individual product structures 115 and to detect (e.g., based on an analysis of the groupings of the product storage structures 115) each of the separate department areas 121a-121j of the product storage facility 105, and to generate virtual boundary lines 195a-195j (as seen in image 184 in FIG. 6) around each one of the individual/separate department areas 121a-121j detected in the image 182. In one approach, the control circuit 310 of the computing device 150 may correlate the size and shape of known department areas stored in the electronic database 140 and/or obtained from an internet-based service 170 to a size and shape of each of the separate department areas 121a-121j detected during the processing/analysis of the image 184 of FIG. 6 to determine which of the known department areas stored in the electronic database 140 and/or obtained from an internet-based service 170 present a match to respective ones of the separate department areas 121a121j detected in the image 184.

As seen in the exemplary image 184 in FIG. 6, the virtual boundary lines 195a-195j extend about the outer edges of each of the separately defined department areas 121a-121j, and form a perimeter around each of the individual department areas 121a-121j. Similarly, the virtual boundary line 197 extends about the outer edge of the physical boundary 113 of the interior space 110 of the product storage facility 105, and forms a perimeter around the physical boundary 113. Generally, the control circuit 310 is programmed to interpret each of the virtual boundary lines 195a-195j as surrounding only one separate department area, and to interpret the virtual boundary line 197 as surrounding only the interior space 110 of the product retail facility 105.

Notably, the analysis of the exemplary interior space 110 depicted in the exemplary image 184 of FIG. 6 resulted in the control circuit 310 of the computing device 150 detecting 10 separate department areas within the interior space 110 of the product storage facility 105. In particular, the separate department areas 121a-121j detected and defined by the control circuit 310 (i.e., by generating virtual boundary lines 195a-195j around them include: 121a—Electronics, 121b—Apparel, 121c—Hardware, 121d—Bakery, 121e—Center, 121f—Sporting Goods, 121g—Meat, 121h—Pharmacy, 121i—Grocery, and 121j—Freezer). It will be appreciated that the number and names of the separate department areas 121a-121j are being shown in FIGS. 6 and 7 by way of example only, and that other product storage structures 115 may have more or less department areas than shown in FIGS. 6-7, and may include differently-named department areas, and may include special areas that of the product storage facility 105 are technically not departments (e.g., point of sale registers/checkout, shopping cart storage, etc.).

In some embodiments, after generating the virtual boundary lines 195a-195j around the individual department areas 121a-121j and the virtual boundary line 197 around the boundary 113 of the interior space 110 of the product storage facility 105, the control circuit 310 of the computing device 150 is programmed to cause the computing device 150 to transmit a signal including the processed image 184 over the network 130 to the electronic database 140 for storage. In one aspect, this image 184 may be used by the control circuit 310 in subsequent image detection operations and/or training or retraining a neural network model as a reference model of a visual representation of the exterior boundary 113 of the interior space 110 and as a visual representation of the separate department areas 121a-121j of the product storage facility 105. More specifically, in some implementations, the control circuit 310 is programmed to perform object detection analysis with respect to images subsequently captured by the image capture device 120 by utilizing machine learning/computer vision modules/models 322 that may include one or more neural network models trained using images such as image 184 stored in the electronic database 140. Notably, in certain aspects, the machine learning/neural network modules/models 322 may be retrained based on physical inspection of the actual department areas 121a-121j of the product storage facility 105 and/or physical inspection of the product storage structures 115 by a worker of the product storage facility 105, and in response to an input received from a user device 160 of the worker.

In certain some embodiments, after generating the virtual boundary lines 195a-195j around the individual department areas 121a-121j and the virtual boundary line 197 around the boundary 113 of the interior space 110 of the product storage facility 105, the control circuit 310 of the computing device 150 is programmed to assign a department label (i.e., a name of the department) to each of the separate department areas 121a-121j of the interior space of the product storage facility. In certain implementations, the control circuit 310 is programmed to obtain, for example, from the electronic database 140 and/or from one or more of the internet-based services 170, data including but not limited to known dimensions of the interior space 110 of the product storage facility 105, known dimensions (height, width, depth, shape) of the product storage structures 115 located within the interior space 110 of the product storage facility 105, known layout (e.g., orientation and physical locations) of the product storage structures 115 within the interior space 110 of the product storage facility 105, known identities of separate department areas at product storage facilities 105, and known types and dimensions of product storage structures 115 that are used within each respective separate department area.

In one approach, the control circuit 310 of the computing device 150 correlates the sizes and shapes of the product storage structures 115 and the sizes and shapes of the separate department areas 121a-121j of the interior space 110 of the product storage facility 105 detected in the image 184, and correlates the boundary lines 195a-195j of the defined department areas 121a-121j to known sizes and shapes of reference product structures and department areas obtained from the electronic database 140 or from an internet-based service 170 to determine which department label (i.e., name) is an appropriate one to assign to which of the separate department areas 121a-121j detected in the image 184 of FIG. 6. As pointed out above, and with reference to FIGS. 6 and 7, the result of the processing and analysis of the exemplary images 180, 182, 184 is an exemplary 3-dimensional image 186 of FIG. 7, showing that the interior space 110 of the product storage facility 105 contains 10 separate department areas, which are assigned the department labels/names as follows: 121a—Electronics, 121b—Apparel, 121c—Hardware, 121d—Bakery, 121e—Center, 121f—Sporting Goods, 121g—Meat, 121h—Pharmacy, 121i—Grocery, and 121j—Freezer).

In one aspect, after defining the separate department areas 121a-121j and/or assigning the department names to each of the department areas 121a-121j, the control unit 310 is programmed to assign a different color on the 2-dimensional map of the product storage facility 105 as in the image 184, such that the individual product structures 115 located in respective ones of the separate department areas 121a-121j defined within the interior space 110 of the product storage facility 105 are assigned an identical color (i.e., such that the product storage structures 115 located in separate department areas 121a-121j are assigned different colors). In another aspect, after defining the separate department areas 121a-121j and/or assigning the department names to each of the department areas 121a-121j, the control unit 310 is programmed to assign a different color on the 2-dimensional map of the product storage facility 105 as in the image 184, such that the area corresponding to each of the separate department areas 121a-121j defined within the interior space 110 of the product storage facility 105 is assigned one unique color (i.e., such that each of the separate department areas 121a-121j is marked with a different color).

In some embodiments, after generating the virtual boundary lines 195a-195j around the individual department areas 121a-121j and the virtual boundary line 197 around the boundary 113 of the interior space 110 of the product storage facility 105, and after assigning department labels to each of the defined department areas 121a-121j in the image 184 of FIG. 6, the control circuit 310 of the computing device 150 is programmed to process the 2-dimensional image 184 of FIG. 6 and convert it into a 3-dimensional map of the interior space 110 of the product storage facility 105. In the illustrated embodiment, 3-D processing of the 2-D image 184 of FIG. 6 results in the image 186, representing a 3-dimensional map of the interior space 110 of the product storage facility 105, where the separate department areas 121a-121j detected in the image 184 of FIG. 6 are identified with department names (i.e., Electronics, Apparel, Hardware, Bakery, Center, Sporting Goods, Meat, Pharmacy, Grocery, and Freezer) in the image 186 of FIG. 7. As such, the above-described processing of the LIDAR data captured by the sensor 214 of the image capture device 120 advantageously results in a 3-d map of the product storage facility 105 that depicts not only the boundary 113 of the interior space 110 of the product storage facility 105, but also the shapes and locations of the product storage structures 115 within the interior space 110, as well as the separate department areas 121a-121j within the interior space 110.

Figure 7:
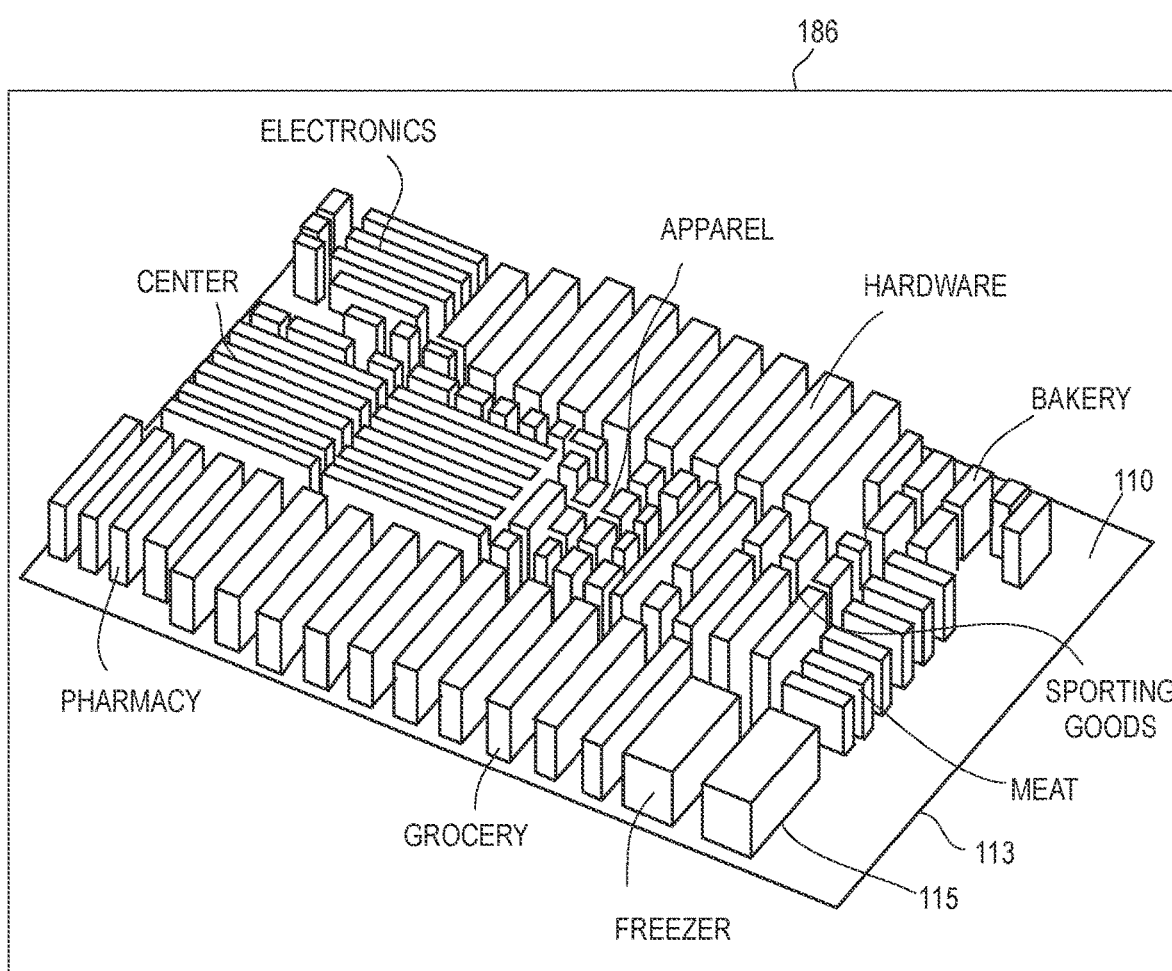
FIG. 7 is a diagram of an exemplary 3-dimensional map of the interior space of the product storage facility that is generated based on the raw image of FIG. 4 in accordance with some embodiments.

In some embodiments, the control unit 310 of the computing device 150 projects the 2-dimensional image 184 of FIG. 6 into the 3-dimensional image 186 of FIG. 7 by utilizing the known dimensions (i.e., height, length, width, and layout) of product storage structures 115 positioned within the interior space 110 of the product storage facility 105. For example, in one approach, the control circuit 310 is programmed to obtain, from the electronic database 140 and/or from one or more of the internet-based services 170, data indicating the known height, length, and width of the product storage structures 115 located in each of the separate department areas 121a-121j of the product storage facility 105, and, based on this obtained known height dimension, to assign an appropriate height, length, and width to each of the product storage structures 115 in each of the separate department areas 121a-121j in the 3-dimensional map of the interior space 110 of the product storage facility 105 (see image 186 in FIG. 7).

In addition to assigning appropriate height, length, and width to the product storage structures 115 when generating the image 188 containing the 3-dimensional map of the product storage facility 105, in some embodiments, the control circuit 310 of the product storage facility 105 is programmed to randomly assign a different color on the 3-dimensional map to the product storage structures 115 located in each of the separate department areas 121a-121j defined within the interior space 110 of the product storage facility 105 (i.e., such that the product storage structures 115 located in separate department areas 121a-121j are assigned different colors). In one aspect, when generating the 3-dimensional map of the product storage facility 105, the control unit 310 is programmed to assign a different color on the 3-dimensional map to each of the separate department areas 121a-121j defined within the interior space 110 of the product storage facility 105 (i.e., such that each of the separate department areas 121a-121j is marked with a different color).

In some embodiments, after generating the image 186 containing the 3-dimensional map of the product storage facility 105, the control circuit 310 of the computing device 150 is programmed to cause the computing device 150 to transmit a signal including the processed image 186 over the network 130 to the electronic database 140 for storage. In one aspect, this image 186 may be used by the control circuit 310 in subsequent image detection operations and/or training or retraining a neural network model as a reference model of a visual representation of the 3-dimensional map of the interior space 110 of the product storage facility 105. More specifically, in some implementations, the control circuit 310 is programmed to perform object detection analysis with respect to images subsequently captured by the image capture device 120 by utilizing machine learning/computer vision modules/models 322 that may include one or more neural network models trained using images such as image 186 stored in the electronic database 140. Notably, in certain aspects, the machine learning/neural network modules/models 322 may be retrained based on physical inspection of the interior space 110 of the product storage facility 105 by a worker of the product storage facility 105, and in response to an input received from a user device 160 of the worker.

As described above, the image capture device 120 is configured for movement about the interior space 110 of the product storage facility 105 while detecting/capturing distance measurement (e.g., LIDAR) data via its sensor 214, and the control circuit 310 of the computing device 150 is programmed to process and analyze an image that is based on this distance measurement data to generate a 3-dimensional map (see image 186, FIG. 7) of the interior space 110 of the product storage facility 105, complete with the shapes and sizes of the product storage structures 115 located within the interior space 110 of the product storage facility 105, as well as the shapes, sizes, and names of the separate department areas 121a-121j of the product storage facility 105. In some embodiments, the sensor 214 of the image capture device 120 includes a camera configured to capture one or more digital photos (e.g., at predetermined intervals and from various angles) of the product storage structures 115 during the movement of the image capture device 120 about the interior space 110 of the product storage facility 105. One such exemplary image 187 of an exemplary storage structure 115 having products 190a-190f located in product storage bins 175a-175f thereon and price tag labels 192a-192f affixed thereto is schematically depicted in FIG. 8.

In some aspects, the control circuit 310 of the computing device 150 is configured to process the image 187 of FIG. 8 to detect the overall size and shape of each of the individual storage bins 175a-175f and products 190a, 190c, 190d, 190e, and 190f (notably, no individual products 190b are present within the storage bin 175b, meaning that the product 190b needs to be replenished) located on the horizontal support members 119a and 119b (e.g., shelves) of the product storage structure 115, which are interconnected by vertical support members 117a and 117b (e.g., posts). The control circuit 310 may be configured to process the image 187 and detect each of the individual storage bins 175a-175f, products 190a-190f, and price tag labels 192a-192f present on the product storage structure 115 in the image 187 by executing one or more machine learning and/or computer vision modules and/or trained neural network modules/models 322. In some aspects, the neural network executed by the control circuit 310 may be a deep convolutional neural network. The neural network module/model 322 may be trained using various data sets, including, but not limited to: raw image data extracted from the image 187 captured by the image capture device 120; meta data extracted from the image 187 captured by the image capture device 120; reference image data associated with reference images of various product storage structures 115 at the product storage facility 105; reference images of product storage bins 175a-175f used at the product storage facility 105; reference images of products 190a-190f stocked and/or sold at the product storage facility 105; reference images of price tag labels 192a-192f applied to the product structures 115 at the product storage facility 105; and planogram data associated with the product storage facility 105.

In some embodiments, the control circuit 310 may be trained to process one or more images 187 of product storage areas 110 at the product storage facility 105 to detect and/or recognize one or more storage bins 175a-175f and products 190a-190f and labels 192-192f using one or more computer vision/machine learning algorithms, including but not limited to Linear Regression, Splining, Nearest Neighbor, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 187, as described herein. It will be appreciated that, in some embodiments, the control circuit 310 does not process the raw image 187 shown in FIG. 8 to result in the processed image 188 shown in FIG. 9, and that the processing of the raw image 187 is performed by an internet-based service 170, after which the processed image 188 is obtained by the control circuit 310 for further analysis.

Figure 9:
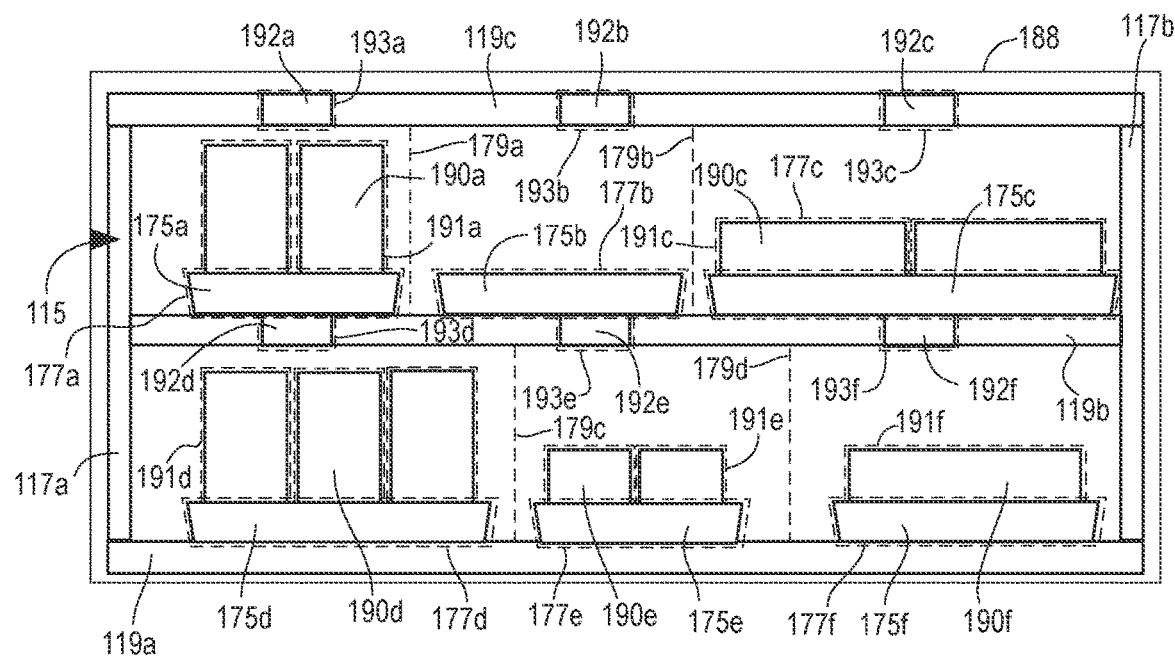
FIG. 9 is a front view of the exemplary product storage structure of FIG. 8, after object detection is performed and virtual boundary lines are generated around the products and the adjacent storage bins in accordance with some embodiments.

In some aspects, the control circuit 310 is configured to process the data extracted from the image 187 via computer vision and one or more trained neural networks to detect each of the individual products 190a, 190c, 190d, 190e, and 190f located on the product storage structure 115 in the image 187, and to generate virtual boundary lines 191a, 191c, 191d, 191e, and 191f as seen in image 188 in FIG. 9 around each one of the individual products 190a, 190c, 190d, 190e, and 190f detected in the image 188. Similarly, in some aspects, the control circuit 310 is configured to process the data extracted from the image 188 via computer vision and one or more trained neural networks to detect the individual product storage bins 175a-175f located on the product storage structure 115 in the image 188, and to generate a set of virtual boundary lines 177a-177f (as seen in image 188 in FIG. 9) each surrounding a respective storage bin 175a-175f detected in the image 188. By the same token, in some aspects, the control circuit 310 is configured to process the data extracted from the image 188 via computer vision and one or more trained neural networks to detect the individual price tag labels 192a-192f located on the product storage structure 115 in the image 188, and to generate a virtual boundary line 193a-193f (as seen in image 188 in FIG. 9) around each of the respective price tag labels 192a-192f detected in the image 188.

As seen in the image 188 in FIG. 9, the virtual boundary lines 191a, 191c, 191d, 191e, and 191f extend about the outer edges of each of the individual products 190a, 190c, 190d, 190e, and 190f located on the product storage structure 115, and form a perimeter around each of the individual products 190. Similarly, the virtual boundary lines 177a-177f extend about the outer edges of each of the individual storage bins 175a-175f, and form a perimeter around each of the individual product storage bins 175a-175f Similarly, the virtual boundary lines 193a-193f extend about the outer edges of the individual price tag labels 192a-192f located on the product storage structure 115, and form a perimeter around the price tag labels 192a-192f. Generally, the control circuit 310 is programmed to interpret each of the virtual boundary lines 195a-195f as surrounding only one individual product 190, to interpret each of the virtual boundary lines 177a-177f as surrounding only one individual storage bin 175a-175f, and to interpret each of the virtual boundary lines 193a-193f as surrounding only one individual price tag label 192a-192f.

In some embodiments, the control circuit 310 of the computing device 150 processes the image 188 to add depth information and estimate the depth of the product storage bins 175a-175f located on the horizontal support members 119a-119c of the product storage structure 115 based on the known location of the image capture device 120 when the image 187 was captured and/or based on actual size of the product storage bins 175a-175f and/or based on the pixel size of the product storage bins 175a-752f in the image 188. In one aspect, the control circuit 310 of the computing device 150 processes the image 188 to aggregate the virtual bounding boxes 177a-175f by utilizing a clustering algorithm to predict which of the virtual bounding boxes 177a-177f are representative of which storage bins 175a-175f, which allows the control circuit 310 to distinguish between the separate storage bins 175a175f and to detect the spaces between adjacent ones of the storage bins 175a-175f In some implementations, the control circuit 310 utilizes the clustering algorithm to determine the centers of the clusters of the storage bins 175a-175f.

In the above-discussed example, by processing the exemplary image 188 of FIG. 9, the control circuit 310 would determine that the product storage structure 115 captured in the image 188 contains six separate product storage bins 175a-175f, each respectively containing one or many individual units of different products 190a-190f (with the storage bin 175b being empty and not containing any individual units of the product 190b, all of which were purchased by customers). In some aspects, after determining the number of separate product storage bins 175a-175f located in the image 188, the control circuit 310 of the computing device 150 generates a set of virtual boundary lines 179a-179d, each of which serves as a partition between adjacent product storage bins 175a-175f As such, in the exemplary image 188 shown in FIG. 9, the virtual boundary line 179a serves as a partition and separates adjacent product storage bins 175a and 175b, the virtual boundary line 179b serves as a partition and separates adjacent product storage bins 175b and 175c, the virtual boundary line 179c serves as a partition and separates adjacent product storage bins 175d and 175e, and the virtual boundary line 179d serves as a partition and separates adjacent product storage bins 175e and 175f.

In some embodiments, after generating the virtual boundary lines 177a-177f around the individual product storage bins 175a-175f and after generating the virtual boundary lines 179a-179d that partition the individual product storage bins 175a-175f, the control circuit 310 of the computing device 150 is programmed to cause the computing device 150 to transmit a signal including the processed image 188 over the network 130 to the electronic database 140 for storage. In one aspect, this image 188 may be used by the control circuit 310 in subsequent image detection operations and/or training or retraining a neural network model as a reference model of a visual representation of the individual storage bins 175a-175f and/or partitions 179a-179d between the adjacent storage bins 175a-175f More specifically, in some implementations, the control circuit 310 is programmed to perform object detection analysis with respect to images subsequently captured by the image capture device 120 by utilizing machine learning/computer vision modules/models 322 that may include one or more neural network models trained using images such as image 188 stored in the electronic database 140. Notably, in certain aspects, the machine learning/neural network modules/models 322 may be retrained based on physical inspection of the product storage structures 115 by a worker of the product storage facility 105, and in response to an input received from a user device 160 of the worker.

In some embodiments, after generating the virtual boundary lines 177a-177f around the individual product storage bins 175a-175f and after generating the virtual boundary lines 179a-179d that partition the individual product storage bins 175a-175f, the control circuit 310 of the computing device 150 is programmed to process the 2-dimensional image 188 of FIG. 9 and convert it into a 3-dimensional map of the interior space 110 of the product storage facility 105. In the illustrated embodiment, 3-D processing of the 2-D image 188 of FIG. 9 results in the image 189 of FIG. 10, representing a 3-dimensional map of the interior space 110 of the product storage facility 105, where the product storage structure 115 on the 3-D map corresponding to the product storage structure 115 shown in the image 188 of FIG. 9 is additionally annotated in FIG. 10 to visually indicate the separate product storage bins 175a-175f stored on the product storage structure 115, which allows the control circuit 310 of the computing device 150 to bring a specific storage structure 115 and a specific storage bin (e.g., the empty storage bin) 175b to the attention of a worker via the user device 160.

To that end, in some embodiments, the control circuit 310 of the computing device 150 is programmed to transmit a signal including the image 189 to the user device 160 of a worker at the product storage facility 105, and this signal, when received by the user device 160, generates on the display screen of the user device 160, for example, via an application installed on the user device 160, a graphical interface depicting the image 189 and/or an associated notification (e.g., empty bin alert with respect to the storage bin 175b) for the worker. As such, the above-described processing of the image data captured by the sensor 214 of the image capture device 120 advantageously results in a 3-d map of the product storage facility 105 that depicts not only the product storage structures 115 within the interior space 110 of the product storage facility 105, but also the individual storage bins 175a-175f located on the product storage structures 115.

Figure 10:
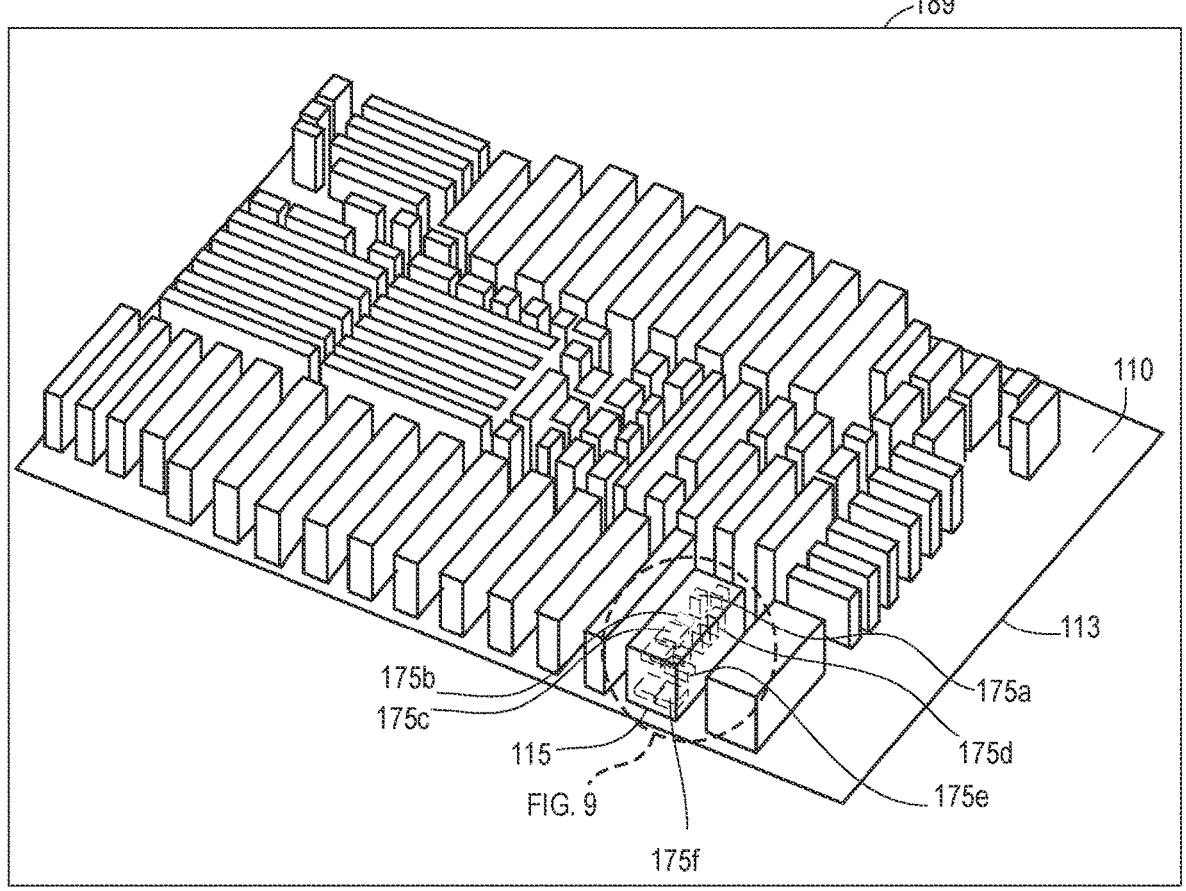
FIG. 10 is a diagram of the exemplary 3-dimensional map of the interior space of the product storage facility of FIG. 7, further processed to include locations of products on the product storage structure corresponding to the product storage structure of FIG. 8.

In some embodiments, after generating the image 189 containing the 3-dimensional map of the product storage facility 105 as shown in FIG. 10, the control circuit 310 of the computing device 150 is programmed to cause the computing device 150 to transmit a signal including the processed image 189 over the network 130 to the electronic database 140 for storage. In one aspect, this image 189 may be used by the control circuit 310 in subsequent image detection operations and/or training or retraining a neural network model as a reference model of a visual representation of the 3-dimensional map of the interior space 110 of the product storage facility 105. More specifically, in some implementations, the control circuit 310 is programmed to perform object detection analysis with respect to images subsequently captured by the image capture device 120 by utilizing machine learning/computer vision modules/models 322 that may include one or more neural network models trained using images such as image 189 stored in the electronic database 140. In certain aspects, the machine learning/neural network modules/models 322 may be retrained based on physical inspection of the product storage structures 115 by a worker of the product storage facility 105, and in response to an input received from a user device 160 of the worker.

With reference to FIG. 11 an exemplary method 1100 of operation of the system 100 for mapping an interior space 110 of a product storage facility 105 is described. The method 1100 includes capturing, via at least one sensor 214, distance measurement data with respect to at least a portion of the interior space 110 of the product storage facility 105 (step 1110). As pointed out above, in certain implementations, step 1110 may include a motorized (autonomous or human-operated) or a non-motorized human-operated image capture device 120 moving about the interior space 110 of the product storage facility 105 while capturing, via a LIDAR sensor 214 of the image capture device 120, distance measurement data of the interior space 110 of the product storage facility 105 at predetermined intervals (e.g., every second, every 2 seconds, every 3 seconds, every 5 seconds, etc.) programmed into the control circuit 206 of the image capture device 120.

The method 1100 of FIG. 11 further includes several actions performed by a computing device 150 including a control circuit 310 and communicatively coupled to the image capture device 120. In particular, the method 1100 includes obtaining the distance measurement data captured by the at least one sensor 214 (step 820). As pointed out above, the computing device 150 may obtain the distance measurement data directly from the image capture device 120 (e.g., over the network 130 via the wireless transceiver 212 of the image capture device and the input/output 340 of the computing device 150), or from the electronic database 140 (e.g., over the network 130 via the input/output 340 of the computing device over the network 130), or from an internet-based service 170 (which may process the distance measurement data as described above to result in the raw image 180 and/or the processed image 182).

In the exemplary illustrated embodiment, after the raw image 180 is obtained by the computing device 150, the method 1100 further includes obtaining a first image 182, which is generated based on the raw image 180, and represents a 2-dimensional map of the interior space 110 of the product storage facility 105 (step 1130). In the illustrated embodiment, the method 1100 further includes the control circuit 310 processing the raw image 180 and/or the processed image 182 via computer vision and/or one or more trained neural network modules/models 322 in order to detect a physical boundary 113 (e.g., wall, window, door, etc.) of the interior space 110 of the product storage facility 105 (step 1140). As pointed out above, in some aspects, the control circuit 310 generates a virtual boundary line 197 around the perimeter of the boundary 113. The method 1100 further includes the control circuit 310 processing the raw image 180 and/or the processed image 182 via computer vision and/or one or more trained neural network modules/models 322 in order to detect individual ones of the product storage structures 115 within the interior space 110 of the product storage facility 105 (step 1150).

After the image 182 is processed by the control circuit 310 of the computing device 150 to detect the boundary 113 of the interior space 110 as well as the individual product storage structures 115 located within the interior space 110, the exemplary process 1100 further includes the control circuit 310 defining separate department areas 121a-121j within the interior space 110 of the product storage facility 110 (step 1160). As mentioned above, in one aspect, the control circuit defines the separate department areas 121a-121j of the interior space 110 of the product storage facility 105 by generating virtual boundary lines 195a-195j (also referred to herein as "virtual bounding boxes") around each of the individual department areas 121a-190j.

As pointed out above, in some embodiments, the control circuit 310 processes the image 184 to aggregate the virtual bounding boxes 195a-195j surrounding the individual department areas 121a-121j as shown in FIG. 6. In one aspect, the control circuit 310 of the computing device 150 processes the image 184 by utilizing a clustering algorithm and information obtained from the electronic database 140 (e.g., known sizes and shapes of product storage structures 115, known sizes and shapes of various departments, etc.) to predict which of the virtual bounding boxes 195a-195j are representative of which department areas 121a-121j. As such, based on the processing of the image 184, the control circuit 310 is able to determine that the image 184 in FIG. 6 shows an interior space 110 that contains 10 separate department areas 121a-121j.

In the illustrated exemplary embodiment, after the control circuit 310 of the computing device 150 defines the separate department areas 121a-121j of the interior space 110 of the product storage facility 110, the method 1100 further includes the control circuit 310 assigning a department label (i.e., department name) to each of the department areas 121a-121j of the interior space 110 of the product storage facility 105 (step 1170). For example, the result of the processing and analysis of the exemplary images 180, 182, and 184 of the interior space 110 of the product storage facility 105 is that the interior space 110 of the product storage facility 105 contains 10 separate department areas, which are assigned the department labels/names as follows: 121a—Electronics, 121b—Apparel, 121c—Hardware, 121d—Bakery, 121e—Center, 121f—Sporting Goods, 121g—Meat, 121h—Pharmacy, 121i—Grocery, and 121j—Freezer).

In the embodiment illustrated in FIG. 11, after the virtual boundary lines 195a-195j are generated around the individual department areas 121a-121j of the interior space 110 of the product storage facility 105, and after department labels/names are assigned to each of the defined department areas 121a-121j, the exemplary method 1100 further includes the control circuit 310 processing/converting the 2-dimensional image into a 3-dimensional map of the interior space 110 of the product storage facility 105 (step 1180). In the illustrated embodiment, 3-D processing of the 2-D image 184 of FIG. 6 results in the image 186 as shown in FIG. 7, representing a 3-dimensional map of the interior space 110 of the product storage facility 105, where the separate department areas 121a-121j detected in the image 184 of FIG. 6 are identified with department names (i.e., Electronics, Apparel, Hardware, Bakery, Center, Sporting Goods, Meat, Pharmacy, Grocery, and Freezer). As such, the above-described processing of the distance measurement data captured by the sensor 214 of the image capture device 120 advantageously results in a 3-d map of the product storage facility 105 that depicts not only the boundary 113 of the interior space 110 of the product storage facility 105, but also the shapes and locations of the product storage structures 115 within the interior space 110, as well as the separate department areas 121a-121j within the interior space 110.

The above-described exemplary embodiments advantageously provide for inventory management systems and methods, where a 3-dimensional map of the interior space of the product storage facility is generated, and this 3-dimensional map not only indicates the exterior boundary of the interior space, but the dimensions and layout of the individual product storage structures within the interior space, as well as the overall shapes of the separate department areas of the interior space of the product storage facility, in some aspects also indicating the locations of individual storage bins on the product storage structures. As such, the systems and methods described herein provide for an efficient and precise managing of on-hand product inventory at a product storage facility and provide a significant cost savings to the product storage facility by saving the product storage facility thousands of worker hours that would be normally spent on manual on-hand product availability monitoring.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; and entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for use in mapping an interior space of a product storage facility, the system comprising:
   at least one sensor configured to capture distance measurement data with respect to at least one portion of the interior space of the product storage facility; and
   a computing device including a control circuit, the computing device being communicatively coupled to the at least one sensor, the control circuit being configured to:
   obtain a first image representing a 2-dimensional map of the interior space of the product storage facility, the first image being based on the distance measurement data; and
   process the first image to:
      define a boundary of the interior space of the product storage facility;
      detect individual ones of structures located within the interior space of the product storage facility;
      based on detection of groupings of multiple of the individual ones of the structures, detect separate department areas of the interior space of the product storage facility and a size of each of the separate department areas;
      based on the size of each of the separate department areas, assign a department label to each of the separate department areas; and
      convert the first image including the 2-dimensional map representing the individual ones of the structures and the separate department areas and department labels assigned to respective ones of the separate department areas into a second image representing a 3-dimensional map of the interior space of the product storage facility.

2. The system of claim 1, further comprising a motorized robotic unit that includes the at least one sensor and that is configured to move about the interior space of the product storage facility to capture the distance measurement data.

3. The system of claim 1, wherein the at least one sensor comprises a light detection and ranging (LIDAR) sensor.

4. The system of claim 1, wherein the control circuit is further configured to generate at least one of:
   a first set of virtual boundary lines, wherein each virtual boundary line of the first set of virtual boundary lines surrounds one of the separate department areas of the interior space of the product storage facility; and
   a second set of virtual boundary lines that surround a defined boundary of the interior space of the product storage facility.

5. The system of claim 4,
   further comprising an electronic database configured to store data indicating known dimensions and layout of the structures located within the interior space of the product storage facility and indicating known identities of the separate department areas of the interior space of the product storage facility; and
   wherein the control circuit is further configured to correlate each virtual boundary line of the first set of virtual boundary lines to the known dimensions and layout of the structures located within the interior space of the product storage facility and to the known identities of the separate department areas to define the separate department areas of the interior space of the product storage facility and to assign each department label to its respective separate department area of the interior space of the product storage facility.

6. The system of claim 5, wherein the control circuit is further configured to obtain the known dimensions and layout of the structures located within the interior space of the product storage facility and, based on the known dimensions and layout of the structures located within the interior space of the product storage facility, to assign a height to each of the structures in the 3-dimensional map of the interior space of the product storage facility.

7. The system of claim 1, wherein the control circuit is further configured to assign a different color on the 3-dimensional map to the structures located in each of the separate department areas defined within the interior space of the product storage facility, wherein each of the structures located within a separate department area are assigned an identical color.

8. The system of claim 1, wherein the control circuit is further configured to process the first image via at least one of splining, linear regression, and nearest neighbor techniques to define the boundary of the interior space of the product storage facility and to detect the individual ones of the structures located within the interior space of the product storage facility.

9. The system of claim 1, wherein the control circuit is further configured to process the second image by adding depth information to the 3-dimensional map of the interior space of the product storage facility to:
   detect individual ones of product storage bins located on the structures detected within the interior space of the product storage facility; and
   define partitions between adjacent ones of the individual ones of product storage bins.

10. The system of claim 9, wherein the control circuit is further configured to add the depth information via a deep neural network trained at least by images of the structures located in the interior space of the product storage facility, images of the product storage bins located on the structures located in the interior space of the product storage facility, and images of products stored on the structures located in the interior space of the product storage facility.

11. A method of mapping an interior space of a product storage facility, the method comprising:
capturing, via at least one sensor, distance measurement data with respect to at least one portion of the interior space of the product storage facility;
obtaining, via a computing device including a control circuit and communicatively coupled to the at least one sensor, the distance measurement data captured by the at least one sensor;
obtaining, via the computing device, a first image representing a 2-dimensional map of the interior space of the product storage facility, the first image being based on the distance measurement data; and
processing, via the control circuit of the computing device, the first image to:
define a boundary of the interior space of the product storage facility;
detect individual ones of structures located within the interior space of the product storage facility;
based on detection of groupings of multiple of the individual ones of the structures, detect separate department areas of the interior space of the product storage facility and a size of each of the separate department areas;
based on a the size of each of the separate department areas, assign a department label to each of the separate department areas; and
convert the first image including the 2-dimensional map representing the individual ones of the structures and the separate department areas and department labels assigned to respective ones of the separate department areas into a second image representing a 3-dimensional map of the interior space of the product storage facility.

12. The method of claim 11, further comprising capturing the distance measurement data via a motorized robotic unit that includes the at least one sensor and that is configured to move about the interior space of the product storage facility to capture the distance measurement data.

13. The method of claim 11, wherein the at least one sensor is a light detection and ranging (LIDAR) sensor.

14. The method of claim 11, further comprising generating, via the control circuit, at least one of:
a first set of virtual boundary lines, wherein each virtual boundary line of the first set of virtual boundary lines surrounds one of the separate department areas of the interior space of the product storage facility; and
a second set of virtual boundary lines that surround a defined boundary of the interior space of the product storage facility.

15. The method of claim 14, further comprising:
storing, in an electronic database, data indicating known dimensions and layout of the structures located within the interior space of the product storage facility and indicating known identities of the separate department areas of the interior space of the product storage facility; and
correlating, via the control circuit, each virtual boundary line of the first set of virtual boundary lines to the known dimensions and layout of the structures located within the interior space of the product storage facility and to the known identities of the separate department areas to define the separate department areas of the interior space of the product storage facility and to assign each department label to its respective separate department area of the interior space of the product storage facility.

16. The method of claim 15, further comprising, via the control circuit:
obtaining the known dimensions and layout of the structures located within the interior space of the product storage facility and, based on the known dimensions and layout of the structures located within the interior space of the product storage facility; and
assigning a height to each of the structures in the 3-dimensional map of the interior space of the product storage facility.

17. The method of claim 11, further comprising assigning, via the control circuit, a different color on the 3-dimensional map to the structures located in each of the separate department areas defined within the interior space of the product storage facility, wherein each of the structures located within a separate department area are assigned an identical color.

18. The method of claim 11, further comprising processing, via the control circuit, the first image via at least one of splining, linear regression, and nearest neighbor techniques to define the boundary of the interior space of the product storage facility and to detect the individual ones of the structures located within the interior space of the product storage facility.

19. The method of claim 11, further comprising processing, via the control circuit, the second image by adding depth information to the 3-dimensional map of the interior space of the product storage facility to:
detect individual ones of product storage bins located on the structures detected within the interior space of the product storage facility; and
define partitions between adjacent ones of the individual ones of product storage bins.

20. The method of claim 19, further comprising adding, the depth information via the control circuit executing a deep neural network trained at least by images of the structures located in the interior space of the product storage facility, images of the product storage bins located on the structures located in the interior space of the product storage facility, and images of products stored on the structures located in the interior space of the product storage facility.

* * * * *